United States Patent [19]
Cribbin et al.

[11] Patent Number: 6,042,699
[45] Date of Patent: Mar. 28, 2000

[54] CRYOGENIC RECTIFICATION SYSTEM WITH CORONA DISCHARGE FEED AIR PRETREATMENT

[75] Inventors: Nancy Rose Cribbin, Brooklyn; Dante Patrick Bonaquist, Grand Island; Alan Barnard Stewart, Snyder; Gregory William Henzler, East Amherst, all of N.Y.

[73] Assignee: Praxair Technology, Inc., Danbury, Conn.

[21] Appl. No.: 09/150,244

[22] Filed: Sep. 10, 1998

[51] Int. Cl.$^7$ ........................................ H05F 3/00
[52] U.S. Cl. .................. 204/164; 422/186.04; 95/99
[58] Field of Search ................... 95/99; 204/168, 204/170, 164; 210/760, 673; 422/186.4, 253, 907, 186.11; 423/359; 436/55

[56] References Cited

U.S. PATENT DOCUMENTS

| | | | |
|---|---|---|---|
| 4,557,735 | 12/1985 | Pike | 55/26 |
| 4,954,320 | 9/1990 | Birmingham et al. | 422/186.04 |
| 5,236,672 | 8/1993 | Nunez et al. | 422/186.04 |
| 5,321,953 | 6/1994 | Olson, Jr. | 62/18 |
| 5,609,736 | 3/1997 | Yamamoto | 204/164 |

*Primary Examiner*—Kathryn Gorgos
*Assistant Examiner*—Thao Tran
*Attorney, Agent, or Firm*—Stanley Ktorides

[57] ABSTRACT

A system including pretreating feed air for a cryogenic air separation plant wherein feed air is passed through an electric field, oxygen is ionized, and ionized oxygen reacts with hydrocarbons upstream of an adsorption prepurifier, and subsequent separation of the feed air by cryogenic rectification.

8 Claims, 4 Drawing Sheets

CRYOGENIC RECTIFICATION SYSTEM WITH CORONA DISCHARGE FEED AIR PRETREATMENT

TECHNICAL FIELD

This invention relates generally to cryogenic rectification and, more particularly, to feed air pretreatment for cryogenic rectification.

BACKGROUND ART

The operation of a cryogenic air separation plant requires that high boiling contaminants, such as water, carbon dioxide and hydrocarbons, be removed from the feed air before entering a column. Water and carbon dioxide will freeze at the cryogenic temperatures associated with the air separation. Hydrocarbons constitute a safety hazard if there is a potential for accumulation in a boiling oxygen pool.

Preferably adsorption prepurifiers are used to remove high boiling impurities from a feed air stream to a cryogenic air separation plant. Two types of such prepurifiers are employed: Thermal Swing Adsorption (TSA) and Pressure Swing Adsorption (PSA). As the names imply, TSA depends primarily on heat to drive the adsorbed contaminants off the adsorbent whereas PSA uses differences in absolute pressure within the adsorbent bed to cause the contaminants to desorb. Both are operated in a batchwise manner where feed air is passed through a clean adsorbent bed and the bed loads up with contaminants which are then removed in a desorption step. Typically, two or more adsorbent beds are used, with at least one bed in the adsorption mode and at least one bed in the desorption mode.

While such adsorption prepurifiers are excellent at removing carbon dioxide and water vapor from a feed air stream to a cryogenic air separation plant, they are typically not completely effective in removing hydrocarbons from the feed air stream. This requires that further measures be taken, such as the use of cold end gel traps and/or column liquid drains to ensure against hydrocarbon build up in oxygen-rich liquid within the column or columns of the cryogenic air separation plant. It would be very desirable to have a system which will improve the effectiveness of hydrocarbon removal from a feed air stream to a cryogenic air separation plant.

Accordingly, it is an object of this invention to provide a system which will enable more effective hydrocarbon removal from a feed air stream to a cryogenic air separation plant which employs adsorbent purification for prepurification of feed air to the plant.

SUMMARY OF THE INVENTION

The above and other objects, which will become apparent to those skilled in the art upon a reading of this disclosure, are attained by the present invention, one aspect of which is:

A method for processing feed air for cryogenic rectification comprising:

(A) passing feed air comprising hydrocarbons through an electric field, ionizing oxygen of the feed air to produce ionized oxygen, and reacting ionized oxygen with hydrocarbons to produce carbon dioxide and water vapor within the feed air;

(B) adsorbing carbon dioxide and water vapor from the feed air onto adsorbent to produce prepurified feed air;

(C) passing prepurified feed air into a cryogenic air separation plant and separating the prepurified feed air by cryogenic rectification to produce at least one of product oxygen and product nitrogen; and (D) recovering at least one of product oxygen and product nitrogen from the cryogenic air separation plant.

Another aspect of the invention is:

Apparatus for processing feed air comprising:

(A) a corona discharge reactor and means for passing feed air comprising hydrocarbons into the corona discharge reactor;

(B) an adsorption prepurifier and means for passing feed air from the corona discharge reactor to the adsorption prepurifier;

(C) a cryogenic air separation plant and means for passing feed air from the adsorption prepurifier to the cryogenic air separation plant; and (D) means for recovering at least one of product oxygen and product nitrogen from the cryogenic air separation plant.

As used herein, the term "feed air" means a mixture comprising primarily oxygen and nitrogen, such as ambient air.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook fifth edition, edited by R. H. Perry and C. H. Chilton, McGraw-Hill Book Company, New York, Section 13, *The Continuous Distillation Process*.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluids into heat exchange relation without any physical contact or intermixing of the fluids with each other.

As used herein, the term "cryogenic air separation plant" means the column(s) wherein fluid such as feed air is separated by cryogenic rectification, as well as interconnecting piping, valves, heat exchangers and the like.

As used herein, the term "hydrocarbons" means any hydrogen and carbon containing compound that exists as a contaminant in the feed air for a cryogenic air separation plant. Examples of such hydrocarbons include methane, ethane, propane, ethylene, acetylene and butane.

As used herein, the term "product oxygen" means a fluid having an oxygen concentration greater than 80 mole percent, preferably greater than 95 mole percent.

As used herein, the term "product nitrogen" means a fluid having a nitrogen concentration greater than 95 mole percent, preferably greater than 99 mole percent.

As used herein, the term "corona discharge reactor" means a device which generates an electric field wherein electrons are accelerated so as to give them sufficient kinetic energy to split an oxygen-oxygen double bond to form ionized oxygen.

As used herein, the term "ionized oxygen" means oxygen molecules having an electric charge and/or oxygen atoms having an electric charge.

DETAILED DESCRIPTION

Figure 1:
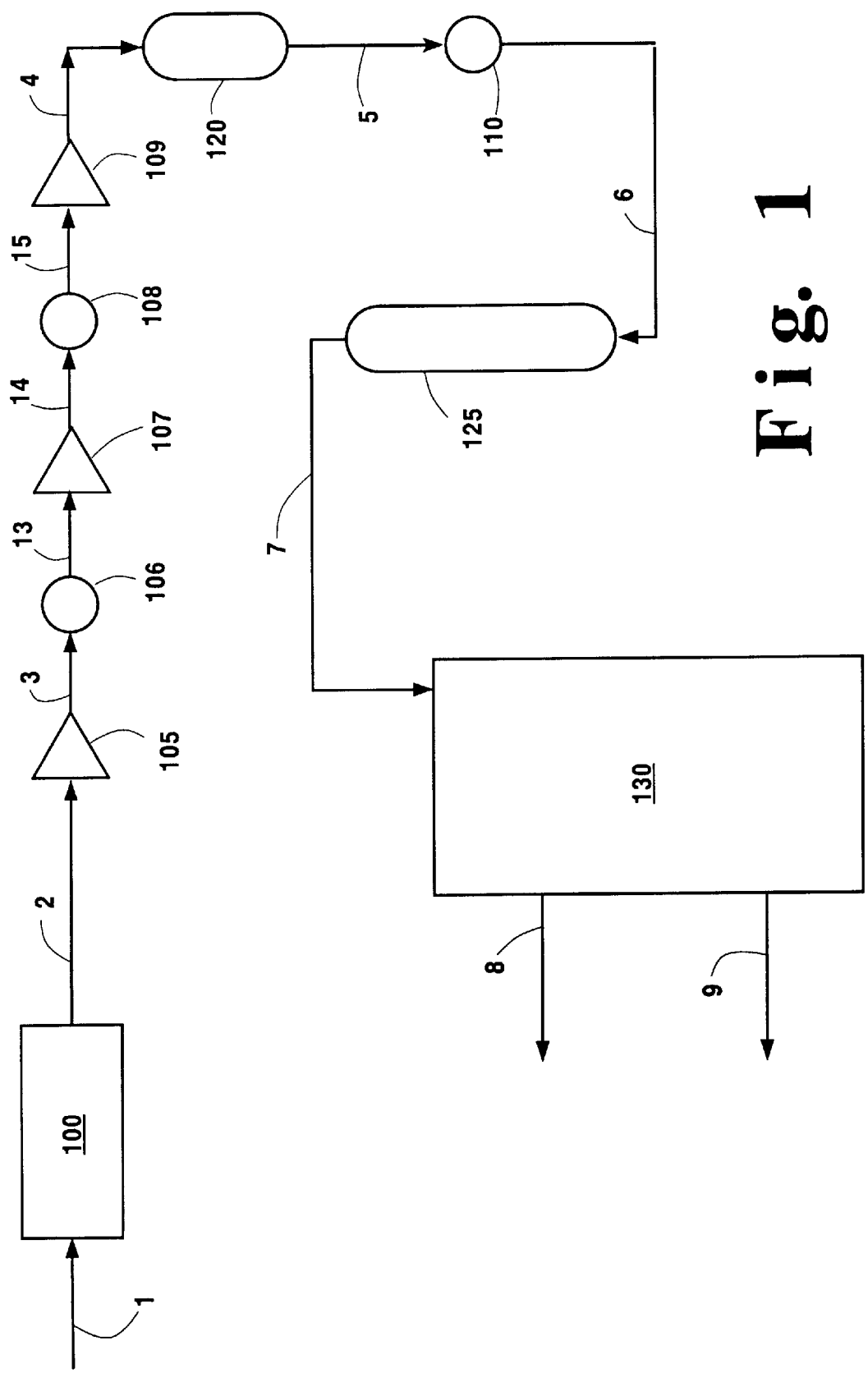
FIG. 1 is a simplified generalized schematic representation of one arrangement of the invention.

The invention will be described in detail with reference to the Drawings. Referring now to FIG. 1, feed air stream 1 which comprises, in addition to oxygen and nitrogen, argon, carbon dioxide, water vapor, and traces of the noble gases, as well as hydrocarbons, is passed into air suction filter house 100 wherein dust and particulate matter carried in the feed air are removed. Dust-free feed air 2 is then compressed, generally to a pressure within the range of from 100 to 150 pounds per square inch absolute (psia). In the embodiment of the invention illustrated in FIG. 1 the dust-free feed air is compressed through a multistage compressor system, specifically a three-stage system. Referring back now to FIG. 1, feed air stream 2 is compressed in first compressor stage 105 and resulting compressed feed air stream 3 is cooled of the heat of compression by indirect heat exchange with cooling fluid by passage through intercooler 106. Resulting feed air stream 13 is then further compressed by passage through second compressor stage 107 and resulting compressed feed air stream 14 is cooled of the heat of compression by indirect heat exchange with cooling fluid by passage through intercooler 108. Resulting feed air stream 15 is then compressed to the desired pressure by passage through third compressor stage 109 to produced compressed feed air stream 4.

FIG. 1 illustrates a preferred embodiment of the invention wherein the corona discharge reactor is located after the final compression stage but before the aftercooler for the feed air emerging from the final compression stage. The corona discharge reactor could be located at any point upstream of the adsorption prepurifier including upstream of the initial feed air compression stage, or between feed air compression stages if multistage feed air compression is employed.

Feed air stream 4 is then passed, at least in part, through corona discharge reactor 120. As will be more fully described below, oxygen within the feed air is ionized and reacts with hydrocarbons to produce carbon dioxide and water vapor. The resulting feed air 5, containing little or no hydrocarbons and also containing higher concentrations of carbon dioxide and water vapor than were in the feed air upstream of the corona discharge reactor, is passed through intercooler 110 wherein it is cooled and from which the feed air emerges as feed air stream 6.

Feed air stream 6 is passed through adsorption prepurifier 125 which typically comprises two or more beds of adsorbent particles with the feed air passing through one bed while another bed is being regenerated in a manner well known to those skilled in this art. Adsorbents which may be used in adsorption prepurifier in the practice of this invention include alumina and molecular sieves, such as 13X and NaY type adsorbents. Adsorption prepurifier 125 may be either of the pressure swing or of the temperature swing type.

Within adsorption prepurifier 125 carbon dioxide and water vapor are adsorbed from the feed air onto the adsorbent particles to produce prepurified feed air 7 which is then passed into cryogenic air separation plant 130 which preferably comprises at least two columns. Within cryogenic air separation plant 130 the prepurified feed air is separated by cryogenic rectification into at least one of product oxygen and product nitrogen. In the embodiment of the invention illustrated in FIG. 1, product oxygen is produced and recovered as shown by stream 9, and product nitrogen is also produced and recovered as shown by stream 8. Argon product may also be produced in plant 130 if, for example, plant 130 comprises an argon column.

Figure 2:
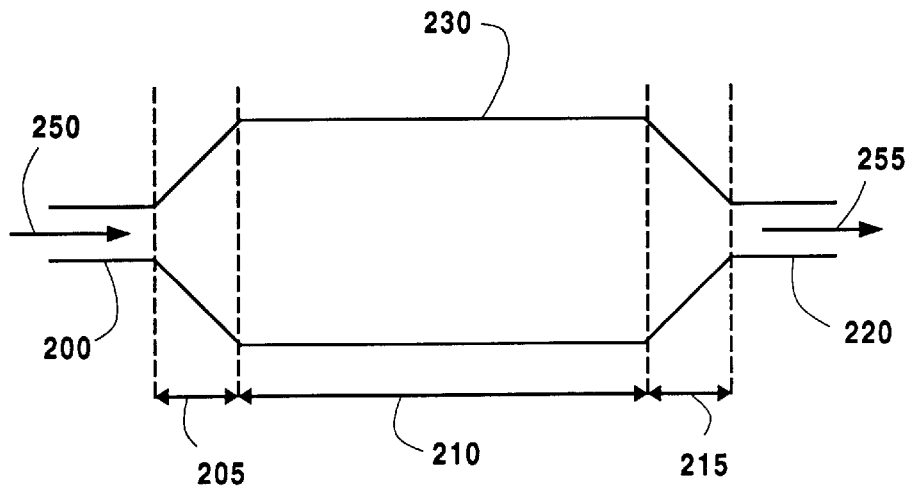
FIG. 2 is a simplified schematic representation of one embodiment of a direct corona discharge reactor useful in the practice of the invention.

FIG. 2 illustrates one simplified embodiment of a direct corona discharge reactor which may be used in the practice of this invention, such as for reactor 120 in the embodiment of the invention illustrated in FIG. 1. Referring now to FIG. 2 feed air 250 passes through inlet piping 200 and into distribution section 205 of direct corona discharge reactor 230. The use of distribution section 205 ensures an even flow of feed air to all portions of reaction or treatment section 210 of corona discharge reactor 230. Within reaction section 210 oxygen in the feed is ionized and the ionized oxygen reacts with hydrocarbons to form carbon dioxide and water. The feed air then passes into collection section 215 of reactor 230 and from there flows out of corona discharge reactor 230 in conduit 220 as shown by feed air stream 255 for further processing such as was described with reference to FIG. 1.

In general, a corona discharge reactor works by creating a high voltage electric field which imparts energy to the molecules affected by it. This increased energy changes the chemical interactions of these molecules. Free electrons, ions, and other extremely reactive species are generated, and interact more freely than they would without the effect of the electric field. An electric field may be described as the electromagnetic condition caused by the application of a voltage potential between two electrodes wherein charged particles will be attracted or repelled within the region between the electrodes. In the practice of the invention, the electric field serves to generate atomized oxygen as well as ionized oxygen, and also generates free electrons which serve to ionize hydrocarbons. The atomized and ionized oxygen is more reactive than molecular oxygen and, moreover, more readily contacts the ionized hydrocarbons due to electrical attraction. Thus the relatively dilute hydrocarbons in the feed air are easily reacted with the oxygen so as to eliminate the hydrocarbons and form carbon dioxide and water vapor in their place.

Figure 3:
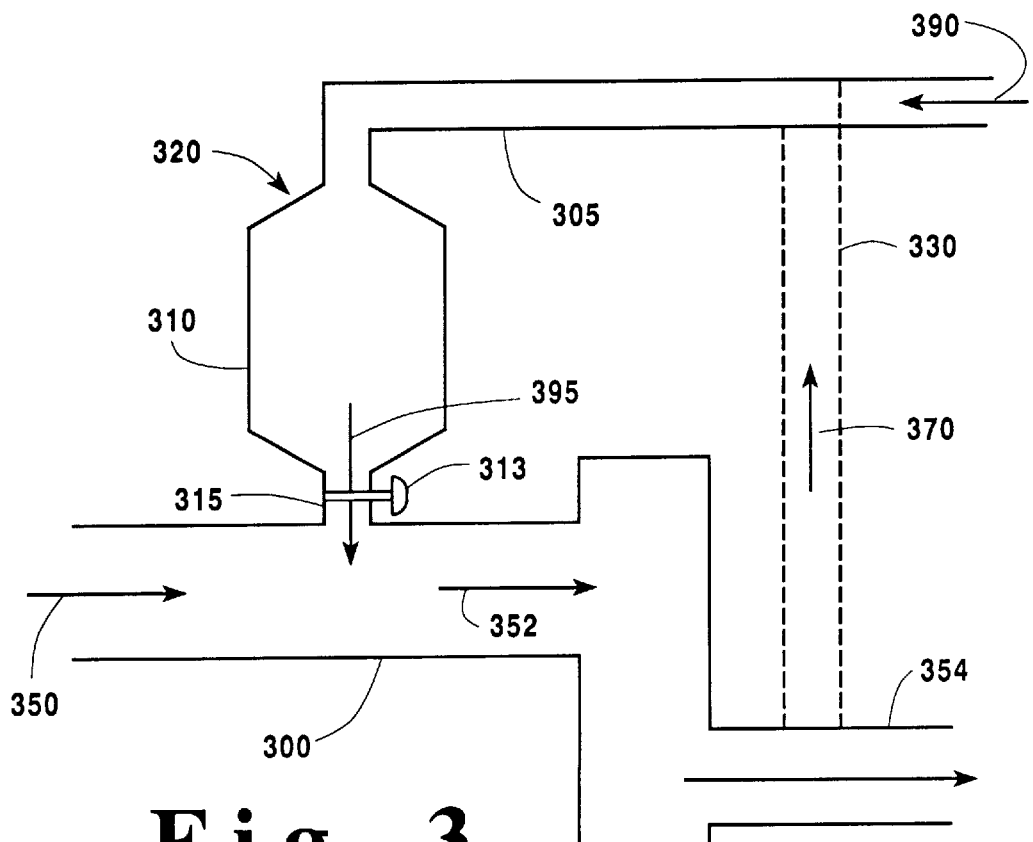
FIG. 3 is a simplified schematic representation of one embodiment of a indirect corona discharge reactor useful in the practice of the invention.

FIG. 3 illustrates one simplified embodiment of an indirect corona discharge reactor which may be used in the practice of this invention, such as for reactor 120 in the embodiment of the invention illustrated in FIG. 1. Referring now to FIG. 3, a portion 390 of the feed air passes through inlet piping 305 and into treatment section 310 of indirect corona discharge reactor 320 wherein oxygen in the feed air is ionized to produce activated stream 395. Within pipe 315 there is a backflow prevention device 313 to prevent flow into section 310 through pipe 315. Activated stream 395 is then mixed with another portion 350 of the feed air in mixing pipe section 300 of indirect corona discharge reactor 320 and ionized oxygen reacts with hydrocarbons to form carbon dioxide and water vapor. The feed air then flows out of indirect corona discharge reactor 320 as stream 352 in conduit 354 for further processing such as was described with reference to FIG. 1. If desired, in addition to or in place of stream 390, a portion 370 of stream 352 may be recycled through conduit 330 to serve as input to the corona discharge reactor.

Figure 4:
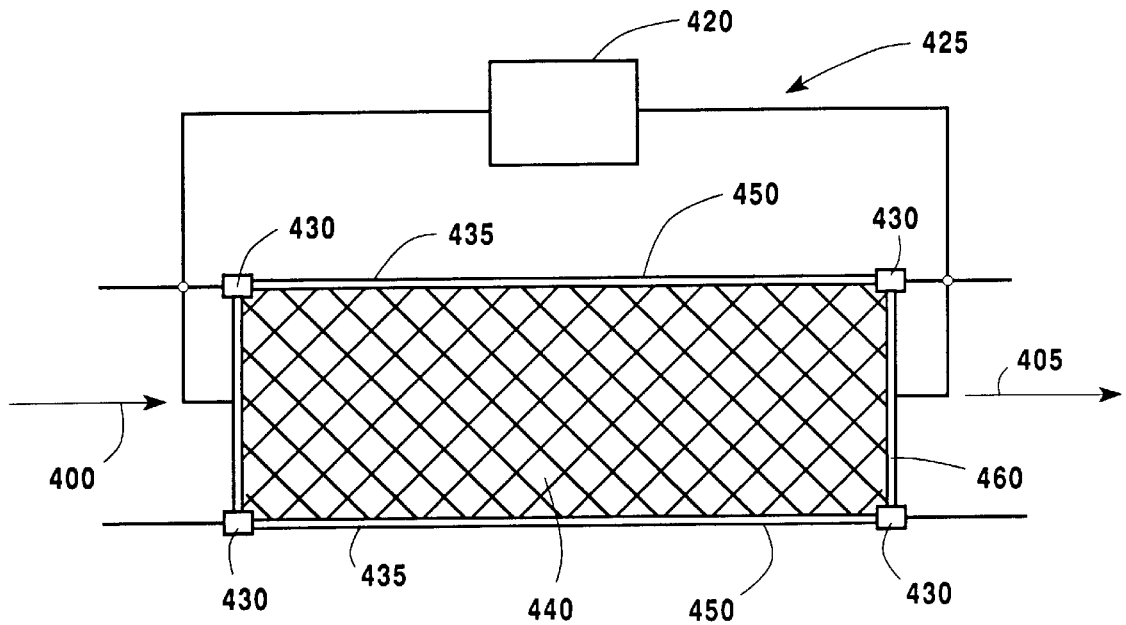
FIG. 4 is a cross-sectional representation of a packed bed corona discharge reactor which may be used in the practice of the invention.

FIG. 4 illustrates one embodiment of a packed bed direct corona discharge reactor which may be used in the practice of this invention, such as for reactor 120 in the embodiment of the invention illustrated in FIG. 1. Referring now to FIG. 4, feed air 400 enters treatment section 450 of corona discharge reactor 425. Treatment section 450 is packed with dielectric pellets such as alumina pellets 440 which are held in place by metal mesh electrodes 460. Insulation 430 separates the electrodes from the tube forming treatment section 450. This tube also may be lined with an insulating or chemically nonreactive liner 435 which may be, for example, of teflon or china porcelain. High voltage alternating current source 420 supplies from 10 to 100 kilovolts sinusoidal alternating current voltage across the electrodes to form an electric field within treatment section 450. As the feed air passes through section 450 oxygen is ionized and reacts with hydrocarbons in the interstitial spaces of packing 440 to produce carbon dioxide and water vapor, and the resulting treated feed air 405 passes out of packed bed corona discharge reactor 425 for further processing such as was described with reference to FIG. 1.

Figure 5:
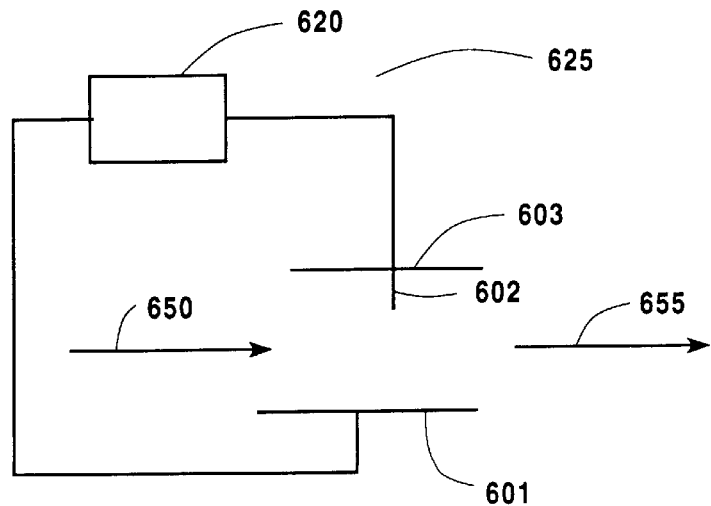
FIG. 5 is a simplified representation of one embodiment of a nanosecond pulse corona discharge reactor which may be used in the practice of this invention.

Nanosecond pulse corona discharge reactors have one or more sharply curved electrodes, such as a point or wire electrode, and are powered by pulses of direct current power nanoseconds in duration, generated through special electric circuits. FIG. 5 illustrates in simplified form one such reactor. Referring now to FIG. 5, there is shown plane electrode 601 and one single point electrode 602. If desired, more than one single point electrode may be employed. The reactor is powered by a direct current nanosecond pulse source 620. Feed air 650 passes through piping 603 which does not form part of electrode 601. The corona fills an approximately conical region between the tip of the point electrode 602 and planar electrode 601. This spacing between the point or points and the planar electrode is typically on the order of millimeters. The resulting treated feed air 655 passes out of nanosecond pulse corona discharge reactor 625 for further processing such as was described with reference to FIG. 1.

Dielectric barrier corona discharge reactors have at least one electrode coated in a layer of high dielectric material and are powered by alternating current as are packed bed reactors.

Figure 6:
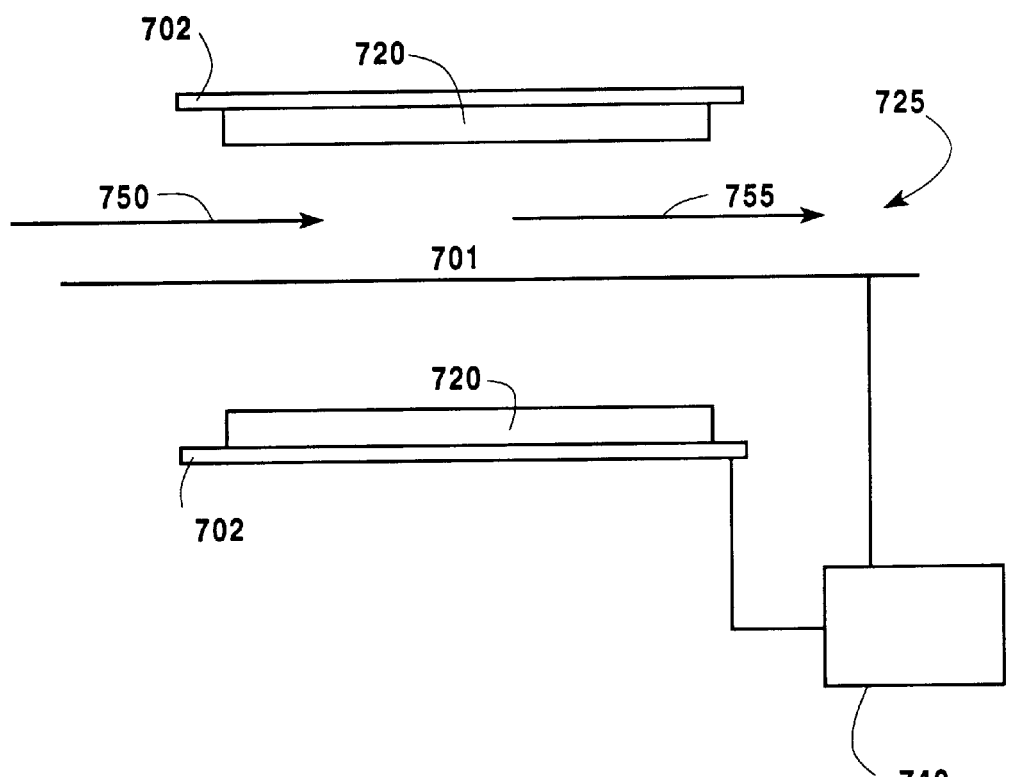
FIG. 6 is a simplified representation of one embodiment of a dielectric barrier corona discharge reactor which may be used in the practice of this invention.

FIG. 6 illustrates in simplified form one such dielectric barrier reactor. Referring now to FIG. 6, there is shown two electrodes 701 and 702 which are charged by a high voltage alternating current source 740. One of the electrodes may be grounded. A layer of high dielectric material 720 lines at least one of the electrodes; the lining may be thicker than the electrode. In the embodiment illustrated in FIG. 6 wherein the reactor is cylindrical, the outer cylinder electrode 702 is lined. The inner wire electrode 701 may also be lined. Feed air 750 flows through the reactor and the corona occurs between the wire 701 and the tube 702 causing hydrocarbons in the feed air to be reacted to form carbon dioxide and water vapor. A number of tubes, such as illustrated in FIG. 6, may be bundled together to form a bank of reactors. Resulting treated feed air 755 passes out of dielectric barrier corona discharge reactor 725 for further processing such as was described with reference to FIG. 1.

Among the dielectric materials which may be used in the practice of this invention one can name borosilicate glass, quartz, alumina, alumina based catalysts, barium titanium oxide, lead titanium oxide and strontium titanium oxide. Among the electrode material which may be used in the practice of this invention one can name stainless steel, tungsten, aluminum, copper, molybdenum, and nickel chromium alloys.

Although the invention has been described in detail with reference to certain preferred embodiments, those skilled in the art will recognize that there are other embodiments of the invention within the spirit and the scope of the claims.

We claim:

1. A method for processing feed air for cryogenic rectification comprising:
   (A) passing feed air comprising hydrocarbons through an electric field, ionizing oxygen of the feed air to produce ionized oxygen, and reacting ionized oxygen with hydrocarbons to produce carbon dioxide and water vapor within the feed air;
   (B) adsorbing carbon dioxide and water vapor from the feed air onto adsorbent to produce prepurified feed air;
   (C) passing prepurified feed air into a cryogenic air separation plant and separating the prepurified feed air by cryogenic rectification to produce at least one of product oxygen and product nitrogen; and
   (D) recovering at least one of product oxygen and product nitrogen from the cryogenic air separation plant.

2. The method of claim 1 wherein the electric field is established in the same location as where the reaction of ionized oxygen with hydrocarbons takes place.

3. The method of claim 1 wherein oxygen is ionized by passage through an electric field at a first location and the ionized oxygen is passed to a second location wherein the reaction of ionized oxygen with hydrocarbons takes place.

4. The method of claim 1 wherein the electric field is established in a volume containing particulate material with interstitial space between the particulate material, and the reaction of ionized oxygen with hydrocarbons takes place within the interstitial space.

5. The method of claim 1 wherein the electric field is established by a series of direct current pulses between a planar electrode and at least one point electrode.

6. Apparatus for processing feed air comprising:
   (A) a corona discharge reactor and means for passing feed air comprising hydrocarbons into the corona discharge reactor;
   (B) an adsorption prepurifier and means for passing feed air from the corona discharge reactor to the adsorption prepurifier, (C) a cryogenic air separation plant and means for passing feed air from the adsorption prepurifier to the cryogenic air separation plant; and (D) means for recovering at least one of product oxygen and product nitrogen from the cryogenic air separation plant.

7. The apparatus of claim 6 wherein the corona discharge reactor comprises a volume filled with particulate matter held in place, at least in part, by electrodes, and wherein a high voltage alternating current source provides alternating current to the electrodes.

8. The apparatus of claim 6 wherein the corona discharge reactor comprises two spaced electrodes at least one of which is lined with dielectric material.

* * * * *